United States Patent [19]
Rees

[11] 3,868,795
[45] Mar. 4, 1975

[54] APPARATUS FOR CONTINUOUSLY SHARPENING A ROTARY BLADE
[76] Inventor: J. Samuel Rees, Rt. 1, Box 4, Preston, Ga. 31824
[22] Filed: Sept. 25, 1972
[21] Appl. No.: 291,734

[52] U.S. Cl. .............................. 51/248, 83/174.1
[51] Int. Cl. ............................................ B24b 3/36
[58] Field of Search ............ 51/246, 247, 248, 250; 83/174, 174.1

[56] References Cited
UNITED STATES PATENTS

| | | | |
|---|---|---|---|
| 1,176,136 | 3/1916 | Demuth | 51/248 |
| 1,772,704 | 8/1930 | Campbell | 51/248 |
| 1,939,754 | 12/1933 | Woodington | 51/248 |
| 2,052,365 | 8/1936 | Stukart | 51/248 |

Primary Examiner—Al Lawrence Smith
Assistant Examiner—Nicholas P. Godici
Attorney, Agent, or Firm—Jones, Thomas & Askew

[57] ABSTRACT

Apparatus for guarding and continuously sharpening a rotary cutting blade of the type used with tire truing apparatus. The blade sharpening apparatus includes a rotary grind wheel which is positioned on one side of the blade for continuous sharpening engagement with the cutting edge. The grind wheel is adjustably mounted relative to the blade, and may be resiliently biased into contact therewith. A deburring member engages the other side of the cutting edge, and the deburring member is mounted for effective deburring action irrespective to the direction in which the blade rotates. The blade guard includes a member which normally surrounds a selected portion of the sharp periphery of the blade and which is selectively retractable to expose the blade for cutting purposes.

9 Claims, 6 Drawing Figures

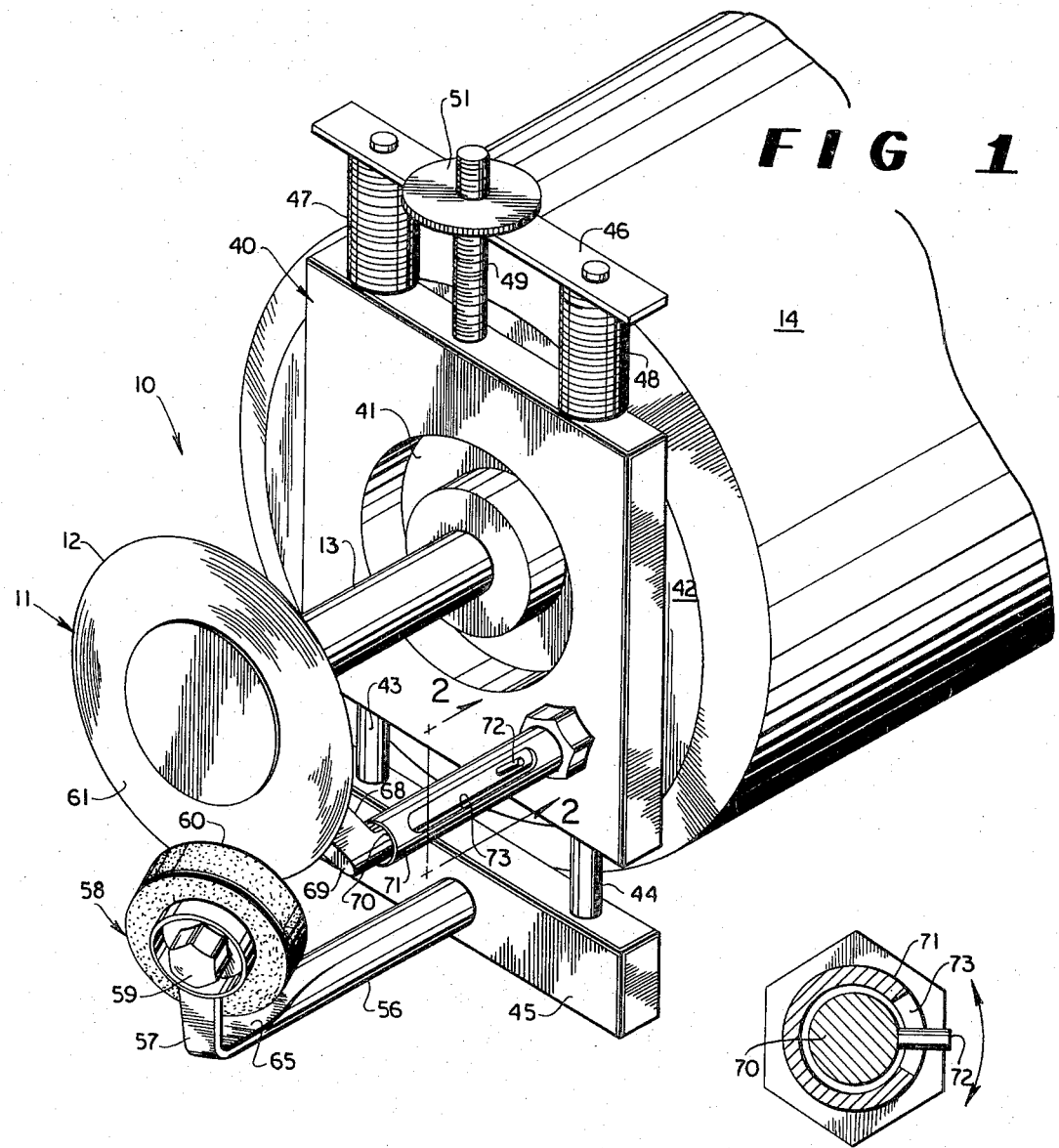
FIG 1
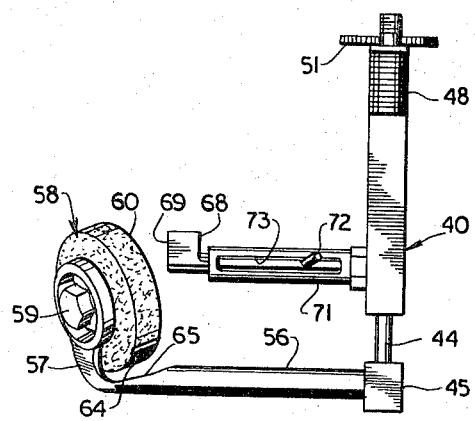
FIG 2
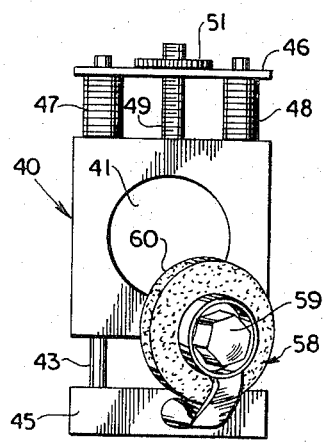
FIG 3
FIG 4

PATENTED MAR 4 1975　　　　　　　　　　3,868,795

APPARATUS FOR CONTINUOUSLY SHARPENING A ROTARY BLADE

This invention relates in general to apparatus for use with a rotary cutting blade and in particular to apparatus for guarding and continuously sharpening a rotary cutting blade of the type used in tire truing apparatus, for example.

The increasing cost of automotive tires, coupled with the increasing popularity of relatively expensive types of tires such as belted tires and radial tires, has made tire users acutely aware of the need to maximize the usable tread life of their tires. One of the known ways in which tire tread life can be optimized involves a technique commonly referred to as "truing" a tire, which utilizes special apparatus functioning in the nature of a lathe to remove rubber from the periphery of the tire tread as necessary to make the tire truly round with respect to the center of rotation of the tire as mounted on a wheel. Tire truing apparatus generally utilizes a rotary blade having a sharp peripheral edge which is traversed along the width of the tire tread while the tire is rotated relative to the spinning rotary blade. In actual practice, the turing operation is carried out in two separate phases, with one half of the tread width being trued while the rotary blade is spinning in a first direction and with the other half of the tire tread width being trued while the blade is spinning in the opposite direction.

It is apparent that the rotary tire truing blade must have an exceedingly sharp edge if the tire truing operation is to be performed expeditiously and with the removal of only the amount of tread rubber necessary to achieve a truly round condition. Moreover, it is essential that the blade remain sharp throughout a tire truing operation.

It is apparent that any blade sharpening device which requires removal of the blade from the truing apparatus, or which at least interferes with the tire truing operation during the sharpening process, is wasteful of time and effort on the part of the truing machine operator, and is also wasteful of truing machine time which could be profitably spent in truing tires.

Another aspect of maintaining a sharp peripheral edge on a rotary tire truing blade involves protecting the blade edge from damage resulting from unwanted contact with foreign objects. For example, it is possible to bump the blade with a tire while the tire is being mounted on the truing machine, and this contact with the blade can cause blade damage and can also cause cutting damage to the tire. Furthermore, the presence of an exposed sharp blade edge in the crowded environment frequently associated with tire-changing shops is conducive of injury to the people who work around the truing machines.

Accordingly, it is an object of the present invention to provide an improved apparatus for sharpening the blade of a tire truing machine.

It is another object of the present invention to provide improved apparatus for guarding the blade of a tire truing machine.

It is still another object of the present invention to provide improved cutting apparatus including apparatus for sharpening and for guarding the blade of a tire truing machine.

It is a further object of the present invention to provide apparatus for continuously sharpening the blade of a tire truing machine.

Many of the other objects and attendant advantages of the present invention will become more readily apparent from the following description of a disclosed, preferred embodiment thereof, including the drawing in which:

FIG. 1 shows an isometric view of the cutting blade portion of a tire truing apparatus, including blade sharpening apparatus according to the disclosed embodiment of the present invention;

FIG. 2 shows a section view taken along line 2—2 of FIG. 1;

FIG. 3 shows an end elevation view of the blade sharpening apparatus of FIG. 1 with the blade removed;

FIG. 4 shows a side elevation view of the apparatus shown in FIG. 3;

Stated in general terms, the present invention includes a rotary grind wheel disposed in contact with one side of the peripheral edge of a blade to be sharpened, and further includes a deburring member disposed against the other side of the rotary blade. The grind wheel is permitted to rotate as the cutting wheel rotates. The deburring member is mounted for a limited extent of motion determined by the rotational direction of the cutting wheel, so that an appropriate contact angle between the deburring member and the cutting wheel is maintained irrespective of the direction in which the cutting wheel rotates. The blade guide is positionable in a first position disposed in surrounding, spaced-apart relation with at least a portion of the periphery of the blade edge, and is selectively retractable to a position exposing the blade for cutting. The blade guard is readily adaptable to be mounted on a conventional motor of a tire truing apparatus with little or no modification required.

Stated more particularly, the particular disclosed embodiment of the present invention shows a tire tread cutting apparatus indicated generally at 10 and including a rotary cutting blade 11 having a sharp peripheral cutting edge 12 extending around the entire circumference of the blade. The blade 11 is mounted for rotation on the shaft 13 of a suitable power source such as the motor 14, and the motor is attached by a suitable mount (not shown) placing the blade in cutting relation with a tire to be trued. Additional details of tire truing apparatus are known to the art and are, accordingly, omitted from the description of the disclosed embodiment of the present invention.

Figure 5:
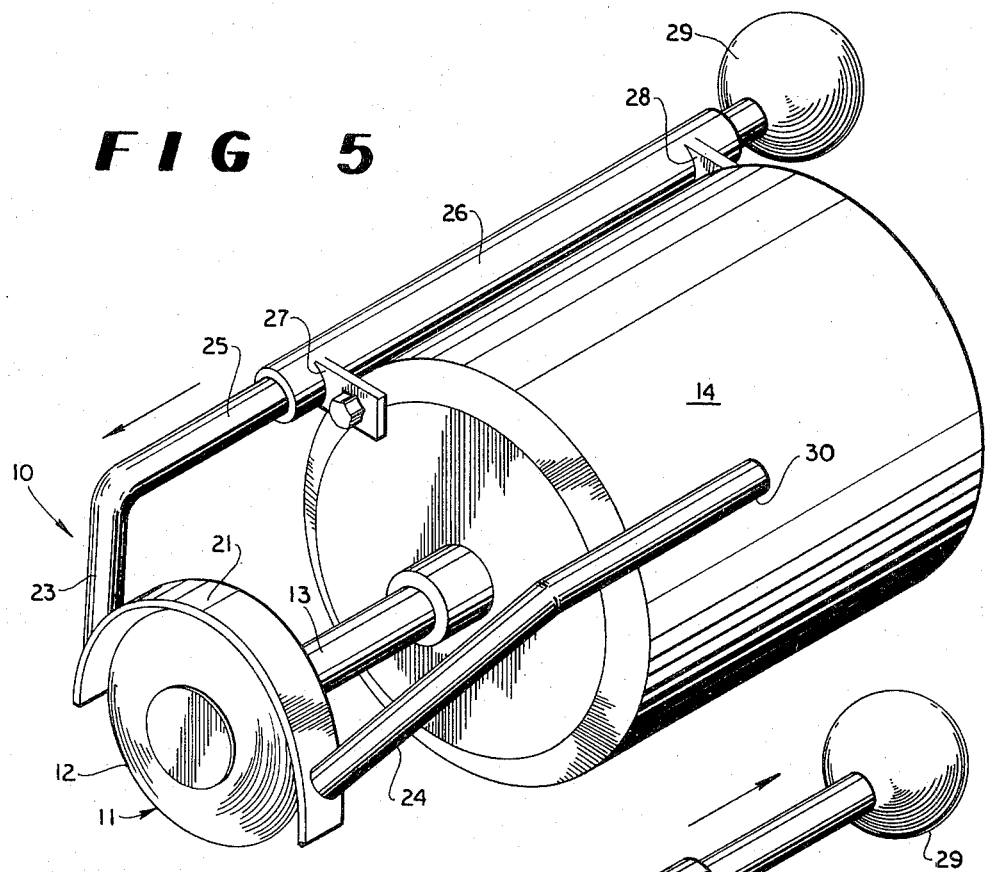
FIG. 5 shows an isometric view of the blade cutting portion of a tire truing apparatus, including a blade guard according to the disclosed embodiment of the present invention.
Figure 6:
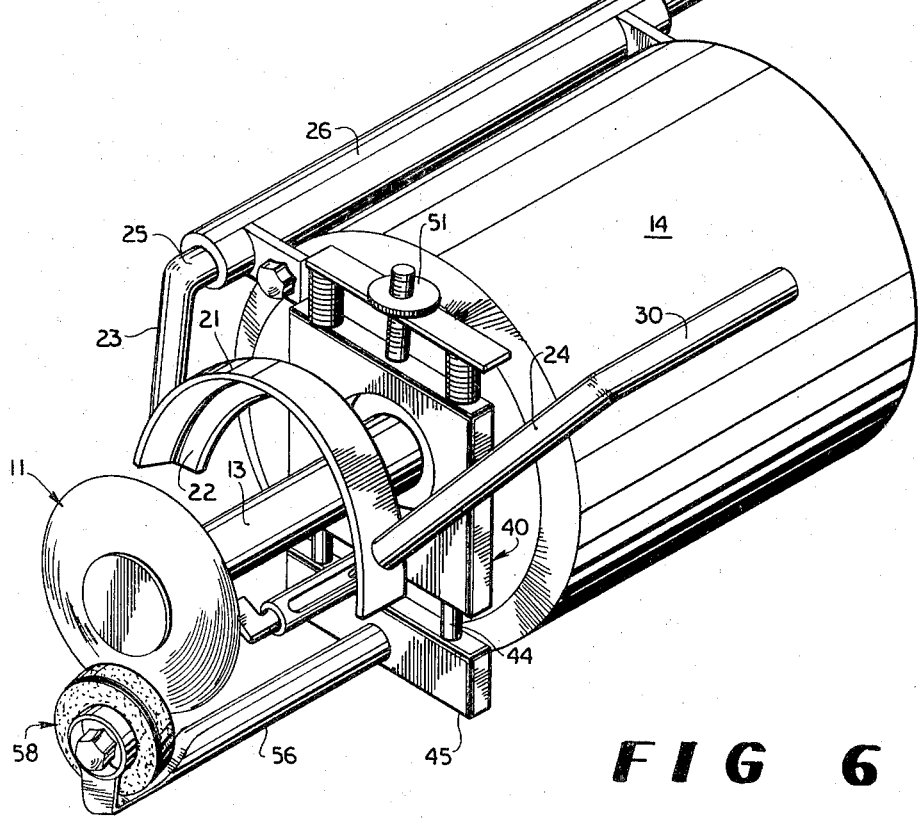
FIG. 6 shows the blade guard of FIG. 5, in retracted position, mounted in combination with the blade sharpening apparatus of FIG. 1.

The blade guard apparatus of the disclosed embodiment, as shown in FIGS. 5 and 6, includes an edge surrounding member 21 which in the disclosed embodiment takes the shape of a semi-circular member concentric with the rotary cutting blade 11 and which is disposed a spaced distance from the circumferential cutting edge 12 of the blade. The edge surrounding member 21 includes a wall portion 22 extending inwardly therefrom. Although the circumferential extent of the edge surrounding member 21 is approximately in the shape of a semicircle in the disclosed embodiment, it will be understood that this is not by way of limitation; it is generally preferable that the edge surrounding member 21 cover at least that portion of the cutting edge which is most exposed to damage by unwanted contact with the blade, however.

Attached to the edge surrounding member 21 are a support member 23 and a guide member 24. Both the support member 23 and the guide member 24 extend outwardly from the edge surrounding member 21 in angular relation to the motor shaft 13 to a point at a location approximately greater than the external dimension of the motor 14, whereupon the support member and the guide member extend in substantially parallel relation with each other along the exterior of the motor. The support member 23, for example, includes a rod 25 which is slidably received within the tube 26, which may be secured to the motor 14 by any suitable attachment such as the tabs 27 and 28. A knob 29 is attached to the end of the rod 25 extending outwardly of the tube 26. The guide member 24 includes a rod portion 30 which may be substantially parallel with the rod 25 and which is disposed to rest along the side of the motor 14 opposite to the tube 26 for sliding movement.

Frictional force between the rod 25 and the tube 26, and between the rod portion 30 and the motor, is generally sufficient to retain the blade guard apparatus in a retracted position, although it will be understood that a suitable catch mechanism may alternatively be used for the purpose.

In considering the operation of the herein-described blade guard, it is initially assumed that the guard is in the position shown in FIG. 5 with the edge surrounding member 21 disposed in peripheral, spaced-apart relation with the cutting edge 12 of the blade. It can be seen that any object, such as a tire or a dropped tool, which approaches the blade 11 on an approach path extending from directly above the cutting edge to approximately a horizontal plane with the cutting edge, will contact the surrounding member 21 instead of the cutting edge 12. The coextensive wall portion 22 adds great structural strength to the edge surrounding member 21 and prevents this member from becoming deformed or otherwise damaged by striking impacts. It will also be seen from the following description of the blade sharpening apparatus that the blade 11 can be rotated to sharpen the edge 12 while the blade guard is disposed in surrounding relation as shown in FIG. 6. When it is desired to withdraw the guard and expose the blade for use, the knob 29 is simply pulled in a direction away from the motor 14, as indicated by the arrow in FIG. 1, whereupon the rod 25 and the support member 23 retract the edge surrounding member 21 to a location whereat the cutting edge of the blade is fully exposed. The rod 30 attached to the guide member 24 defines the movement of the edge surrounding member 21 so that this member will not contact or otherwise interfere with the operation of the cutting blade 11.

Turning next to a consideration of the disclosed embodiment of the blade sharpening portion of the present invention, a mounting block 40 having an opening 41 of diameter larger than the motor shaft 13 is suitably attached to the front end 42 of the motor 14. A pair of guide members 43 and 44 are slidably disposed in corresponding passageways extending through the mounting block 40 on either side of the opening 41, and the two guide members 43 and 44 are secured at first ends thereof to a support block 45. The opposite ends of the guide members 43 and 44 are secured in a retaining member 46. The retaining member 46 is biased away from the mounting block 40 by suitable resilient devices such as the compression springs 47 and 48 which surround the ends of the guide members 43 and 44 extending between the retaining member and the mounting block. A threaded rod 49 is secured in the mounting block 40 and extends outwardly to pass freely through an opening in the retaining member 46. A knob 51 is threaded onto the free end of the threaded rod 49.

Extending from the support block 45 in a direction toward the cutting blade 11 is an arm 56 which may be substantially parallel with the motor shaft 13 and which has a free end 57 positioned on the side of the cutting blade 11 remote from the motor 14. A circular grind wheel 58 is mounted as at 59 for rotation on the free end 57. It is particularly apparent from FIG. 3 that the free end 57 has a predetermined angular relation relative to the arm 56 which places the side 60 of the grind wheel 58 into the desired contact with one beveled side 61 of the cutting blade 11. It will be understood that the specific angular orientation of the free end 57 is thus determined by the particular cutting blade and the particular side configuration of the grind wheel in use, as is obvious to those skilled in the art of blade sharpening.

It has been found that the dimensions of the free end 57 and the arm 56 are preferably chosen to minimize the clearance space 64 which exists between the lowermost point on the grind wheel 58 and the arm 56. In the illustrated embodiment, the support arm 56 has been undercut as at 65 to provide the aforementioned minimum clearance 64. It has been found that the accumulation of rubber particles which would otherwise occur around the grind wheel and associated mounting components is minimized if not eliminated by maintaining the clearance space 64 at substantially that minimum amount required to permit unimpeded rotation of the grind wheel at all times.

A deburring tool 68 having an edge 69 disposed for engagement with the cutting edge 12 of the blade 11 is mounted on a post 70 received for sliding and reciprocal movement within a hollow tube 71 secured to the mounting block 40 and terminating a spaced distance from the motor-confronting side of the cutting blade. A pin 72 secured to the post 70 and extending through an elongated slot 73 in the tube 71 provides a lost-motion connection between the tube and the post, with the width of the slot 73 being sufficiently larger than the diameter of the pin 71 to permit a limited extent of angular movement of the post 70 relative to the tube 71. The post 70 is biased outwardly by means of a spring (not shown) enclosed within the tube 71 to place the edge 69 into contact with the cutting blade 11.

Continuous sharpening of the cutting blade 11 is accomplished by adjusting the knob 51 to permit the support block 45 to be drawn toward the mounting block 40 to an extent which places the side 60 of the grind wheel 58 into grinding engagement with the beveled side 61 of the cutting blade 11. The knob 51 may be adjusted an amount beyond the point of adjustment whereat the grind wheel and the cutting blade begin to make contact, so that resilient contact between the grind wheel and the cutting blade is maintained by the force of the springs 47 and 48. This resilient biased contact of the grind wheel 58 against the rotary cutting blade 11 allows the abrasive side 60 to maintain constant contact with the beveled side 61 throughout rotation of the cutting blade irrespective of any eccentric movement caused by the cutting blade being out of round. It will be understood that rotational movement is imparted to the grind wheel 58 by rotation of the cutting blade 11.

Since the grind wheel always contacts only one side of the cutting wheel, it is necessary to maintain the edge 69 of the deburring tool 68 in constant contact with the other side of the cutting blade to maintain a smooth and burr-free cutting edge 11. Moreover, since the cutting blade 11 is rotated in opposite directions during a tire truing operation, the lost-motion mounting of the deburring tool provided by the pin 72 movably received within the slot 73 enables the edge 69 to assume an appropriate following angle of contact with the cutting blade 11.

It will be understood that the foregoing relates only to a preferred disclosed embodiment of the present invention, and that numerous alterations and modifications may be made therein without departing from the spirit or the scope of the invention as set forth in the appended claims.

What is claimed is:

1. Apparatus for continuously sharpening the peripheral edge of a rotary cutting blade, comprising:
   a blade sharpening member mounted in blade sharpening contact with one side of the peripheral edge of a blade to be sharpened;
   deburring means mounted to be disposed in operative contact with the other side of said peripheral edge;
   said deburring means including a deburring member urged into contact with such other side at a predetermined certain contact angle following the peripheral movement of the blade edge in a first direction of rotation; and
   means disposing said deburring member for limited angular movement relative to the peripheral edge of the blade to permit said deburring member to assume said predetermined certain contact angle in response to selective rotation of said rotary cutting blade in either direction.

2. Apparatus as in claim 1, further comprising:
   adjustable means supporting said blade sharpening member for selectively adjusting the position of said blade sharpening member relative to the cutting blade without changing the position of said deburring member relative to the cutting blade.

3. Apparatus for continuously sharpening the peripheral edge of a rotary cutting blade, comprising:
   a blade sharpening member mounted in blade sharpening contact with one side of the peripheral edge of a blade to be sharpened;
   deburring means mounted to be disposed in operative contact with the other side of said peripheral edge;
   a mounting member secured in fixed spaced relation to the rotary cutting blade;
   a support member connected to said mounting member in spaced relation which is selectively adjustable along a predetermined path of movement;
   first means connected to said support member and mounting said blade sharpening member in proximate relation to said one side of the peripheral edge of the rotary cutting blade so that sharpening contact between said blade sharpening member and the peripheral edge is obtained by said selective adjustment;
   second means connected to said mounting member in spaced relation with said other side of the peripheral edge;
   said deburring means supported by said second means for said disposition in operative contact with the other side of the peripheral edge; and
   connecting means interposed between said second means and said deburring means and operative to allow said deburring means to undergo a predetermined limited extent of movement defining a certain angle of contact between said rotary cutting blade and said deburring means in response to rotation of said peripheral edge in either direction.

4. Apparatus as in claim 3, wherein:
   said connecting means comprises an aperture in one of said second means and said deburring means and having a certain dimension in alignment corresponding to said direction of deburring means limited movement;
   a lug dimensioned to be movably received in said aperture and connected to the other of said second means and said deburring means, said lug disposed in said aperture for movement along said certain dimension thereof to allow said deburring means to undergo said movement.

5. Apparatus for continuously sharpening the peripheral edge of a rotary cutting blade, comprising:
   a blade sharpening member mounted in blade sharpening contact with one side of the peripheral edge of a blade to be sharpened;
   deburring means mounted to be disposed in operative contact with the other side of said peripheral edge;
   a mounting member secured in fixed spaced relation to the rotary cutting blade;
   a support member connected to said mounting member in spaced relation which is selectively adjustable along a predetermined path of movement;
   first means connected to said support member and mounting said blade sharpening member in proximate relation to said one side of the peripheral edge of the rotary cutting blade so that sharpening contact between said blade sharpening member and the peripheral edge is obtained by said selective adjustment;
   second means connected to said mounting member in spaced relation with said other side of the peripheral edge;
   said deburring means supported by said second means for said disposition in operative contact with the other side of the peripheral edge;
   said cutter blade being mounted for rotation on a shaft extending outwardly of a drive means;
   said mounting means being secured in fixed relation relative to said drive means and said cutter blade;
   adjustable means connecting said support member to said mounting member for providing a selectively adjustable amount of spacing along a direction radial to the shaft of said drive means;
   said adjustable connecting means including resilient means urging said support member toward said selected amount of spacing and resiliently yieldable in a direction of increased spacing from said shaft;
   said first means extending from a first end at said support member in spaced relation to said shaft and the peripheral edge of the cutting blade to terminate at a second end adjacent said one side of the peripheral edge of the cutting blade;

said blade sharpening means comprising a grind wheel mounted for rotation on said second end of said first means at an angle placing an abrasive surface of said grind wheel in rotation-imparting contact with said peripheral surface;

said second means comprises a member defining a receptacle facing toward said other side of said peripheral edge; and said deburring means includes a member received in said receptacle and operative to undergo no more than a limited extent of movement in directions corresponding to the directions of rotation of said peripheral edge.

6. Apparatus for continuously sharpening the peripheral edge of a rotary blade mounted for rotation by a drive shaft, comprising:

a support member mounted in fixed relation to the peripheral edge of the rotary blade;

first support means adjustably connected to said support member for selective positioning in radial spaced apart relation to said peripheral edge;

said first support means including resilient means urging said first support means toward said selected radially spaced position and being resiliently yieldable in a direction of increased radial spacing;

a blade sharpening member mounted on said first support means maintained in blade sharpening contact with one side of said peripheral edge; and deburring means mounted on said support member and urged into maintained deburring contact with another side of said peripheral edge, irrespective of said radial spacing of said blade sharpening member on said first support means.

7. Apparatus as in claim 6, wherein said deburring means comprises second support means extending from said support member and maintaining said deburring means in predetermined angle of deburring contact with said other side of the peripheral edge irrespective of the direction in which said blade rotates.

8. Apparatus as in claim 6, wherein:

said first support means extends from said support member at a location spaced from said other side of the peripheral edge of the cutting blade to an end spaced from said one side thereof; and said blade sharpening member comprises a grind wheel mounted for rotation on said end of said first support means and having an abrasive surface yieldingly maintained in engagement with said one side of the peripheral edge.

9. Apparatus as in claim 8, wherein:

said end of said first support includes an angularly disposed member defining a location whereat said grind wheel is mounted for rotation;

said location on said angularly disposed member extending from said end of first support means no more than the minimum extent necessary to provide rotational clearance between said grind wheel and said first support means.

* * * * *